(12) United States Patent
Guo et al.

(10) Patent No.: US 12,092,830 B1
(45) Date of Patent: Sep. 17, 2024

(54) AR GLASSES

(71) Applicant: WICUE USA INC., Santa Clara, CA (US)

(72) Inventors: Cai Guo, Santa Clara, CA (US); Fenghua Li, Santa Clara, CA (US)

(73) Assignee: WICUE USA INC., Santa Clara, CA (US)

( * ) Notice: Subject to any disclaimer, the term of this patent is extended or adjusted under 35 U.S.C. 154(b) by 0 days.

(21) Appl. No.: 18/395,455

(22) Filed: Dec. 22, 2023

(51) Int. Cl.
*G02B 27/01* (2006.01)
*G02F 1/13363* (2006.01)

(52) U.S. Cl.
CPC ... *G02B 27/0172* (2013.01); *G02F 1/133638* (2021.01); *G02B 2027/0178* (2013.01)

(58) Field of Classification Search
CPC ........ G02B 27/0172; G02B 2027/0178; G02F 1/133638
See application file for complete search history.

(56) References Cited

U.S. PATENT DOCUMENTS

2020/0355929 A1* 11/2020 Zhang ................. G02B 27/425
2021/0080763 A1* 3/2021 Sulai ........................ G02B 3/08
2022/0382060 A1* 12/2022 Sato ................... G02B 27/0172

* cited by examiner

*Primary Examiner* — Anne M Hines
(74) *Attorney, Agent, or Firm* — PV IP PC; Wei Te Chung (57) ABSTRACT

The present disclosure discloses AR glasses including an image projection device, an optical lens, a beam splitter, a first ¼λ wave plate, a curved half-mirror, and a liquid crystal dimming film. The liquid crystal dimming film includes a polarizer and a dye-doped liquid crystal layer. The light transmittance of the dye-doped liquid crystal layer is adjusted by an applied voltage. When the liquid crystal layer absorbs light, it can effectively block external stray light, and also prevent viewing displayed image from being viewed from an outside world to achieve privacy protection. This greatly improves the contrast of the virtual image and enhance the immersion.

12 Claims, 10 Drawing Sheets

AR GLASSES

TECHNICAL FIELD

The present disclosure relates to a technical field of AR glasses, and in particular to, AR glasses.

BACKGROUND

In traditional VR display devices, the light emitted by the display device is completely isolated from the outside, and people can only view an immersive virtual picture and cannot view the external real scene. However, An AR display device can allow the human eyes to view the internal virtual image, and the external light can enter the human eyes through the display device and be combined with the virtual image, which is called an augmented reality (AR) display.

However, in the AR device, there are usually two problems. One is that the virtual image can be seen by outside observers, leading to privacy issues. The other is that external light interferes with the virtual image and affects the imaging contrast. In the field of AR display, the currently mainly commercialized technical solutions are the BB solution (Bird Bath) and the optical waveguide solution. The technology used in dimming devices combined with AR display devices is electrochromic technology (EC technology). EC (Electrochromism) is a technology that achieves color and transmittance changes through reversible electrochemical reactions. It can improve the current light leakage and screen washout problems of AR to a certain extent. However, EC technology has many problems and cannot further resolve the problems faced by AR. The main problems of EC technology are as follows: poor reliability, color cast, poor color change uniformity, slow color change response rate, low contrast, poor ability to eliminate screen light leakage, and inability to achieve full spherical lamination. At this time, we urgently need a dimming device that can adjust the intensity of incident light from the outside at any time and prevent the virtual image from leaking.

SUMMARY

In an aspect of the present disclosure is to provide AR glasses, aiming to solve the current technical problem of front light leakage of AR glasses, which causes a person in the art opposite to the user of the glasses to see the image inside the device, which leaks privacy.

To achieve the above objective, an embodiment of the present disclosure, on one hand, provides a kind of AR glasses, where they include an image projection device, an optical lens, a beam splitter, a first $1/4\lambda$ wave plate, a curved half-mirror, and a liquid crystal dimming film. The liquid crystal dimming film includes polarizer and dye-doped liquid crystal layer. The light transmittance of the dye-doped liquid crystal layer can be adjusted by adjusting the applied voltage. When the dye-doped liquid crystal layer absorbs light, it can effectively block external stray light and prevent the display screen from being viewed from an outside world to achieve privacy protection;

After the light emitted by the image projection device passes through the optical lens, it passes through the obliquely arranged beam splitter. The beam splitter converts the light into horizontal linearly polarized light and reflects it to the first $1/4\lambda$ wave plate, the first $1/4\lambda$ wave plate converts linearly polarized light into circularly polarized light, part of the circularly polarized light is reflected to the observer's eyes through the curved half-mirror, and part of the circularly polarized light is transmitted through the half-mirror and hits the liquid crystal dimming film and is absorbed by the liquid crystal dimming film.

Further, the liquid crystal dimming film includes a second $1/4\lambda$ wave plate, a first polarizer, a first conductive layer, a first alignment layer, a liquid crystal layer, a second alignment layer, a second conductive layer, and a second polarizer, stacked in sequence. The second $1/4\lambda$ wave plate changes the circularly polarized light that passes through the curved half-mirror into linearly polarized light in a specific direction and then the linearly polarized light is absorbed by the first polarizer.

Further, the AR glasses further include curved lenses, and the liquid crystal dimming film is disposed inside the curved lenses.

Further, the optical lens is a free-form lens.

Further, the image projection device is one of an organic light emitting diode (OLED), a liquid crystal display (LCD), a liquid crystal on silicon (LCOS), a micro electro mechanical system (MEMS), and a digital micromirror device (DMD).

Further, the second $1/4\lambda$ wave plate is disposed on a side of the first polarizer close to the curved half-mirror, an anti-reflective coating is applied onto the outer surface of the second $1/4\lambda$ wave plate close to the curved half-mirror.

Further, a layer of OCA (optically clear adhesive) is located between the second polarizer and the curved lens, and the liquid crystal dimming film is fixed to the curved lens through OCA.

Further, the liquid crystal in the liquid crystal layer is one of TN, HTN, STN, VA, ECB, OCB, and GH LC.

Further, the optical axis of the second $1/4\lambda$ wave plate and the light absorption axis of the first polarizer form an included angle of 45° or 135°.

On the other hand, provided is a kind of AR glasses, where they include an image projection device, an optical lens, a beam splitter, a curved half-mirror, a liquid crystal dimming film, and a curved lens; the transmittance of the liquid crystal dimming film is adjusted by adjusting the voltage. When the liquid crystal dimming film absorbs light, it can effectively block external stray light and prevent the display screen from being viewed from the outside world to achieve privacy protection;

After the light emitted by the image projection device is amplified and focused by the optical lens, it passes through the beam splitter arranged obliquely (e.g., at an angle with a horizontal level). The beam splitter converts the light into horizontal linearly polarized light and reflects it to the curved half-mirror, part of the linearly polarized light is reflected to the observer's eyes through curved half-mirror to form a virtual picture, and part of the linearly polarized light is transmitted through the curved half-mirror to the liquid crystal dimming film and is absorbed by the liquid crystal dimming film.

Further, the liquid crystal dimming film includes a first polarizer, a first conductive layer, a first alignment layer, a liquid crystal layer, a second alignment layer, a second conductive layer, and a second polarizer, stacked in sequence. The first polarizer absorbs the linearly polarized light that passes through the curved half-mirror. The light transmission axis of the first polarizer is perpendicular to the polarization direction of linearly polarized light reflected by the beam splitter.

Further, the liquid crystal layer includes a single liquid crystal layer or double liquid crystal layers.

Compared with the existing technology, the beneficial effects of the technical solution of the present disclosure are described below:

The present disclosure discloses a kind of AR glasses applied to the AR product of the BB (Bird Bath) solution. In the AR product of the BB solution, when the incident light passes through a beam splitter arranged obliquely, the light is reflected horizontally to the curved half-mirror. At this time, most of the light is reflected by the curved half mirror and enters the observer's eyes. Thus, the observer can see a clear projection image. Part of the light propagates outward through the curved half-mirror. The light at this time is usually in a circularly polarized state or an elliptically polarized state. If there is no obstruction by the liquid crystal dimming film, light leakage will occur, and outside observers can see the projected image, leading to privacy issues. The light transmittance of the liquid crystal film is adjusted by applied voltage. When the liquid crystal layer darkens, it can effectively block light leakage and protect privacy. At the same time, in this mode, it can block external light from washing the virtual image and improve the contrast of the virtual image; A second ¼λ wave plate and a first polarizer are arranged in sequence on the side of the liquid crystal dimming film close to the curved half-mirror, where the optical axis of the second ¼λ wave plate and the light absorption axis of the first polarizer form an included angle of 45° or 135°. The light leakage propagating outward through the curved half-mirror is usually in a circularly polarized state or an elliptically polarized state. The leaked light is converted into linearly polarized light in a specific direction after passing through the second ¼λ wave plate. The first polarizer immediately adjacent to the second ¼λ wave plate can effectively absorb the leaked, linearly polarized light in a certain direction. If the liquid crystal dimming film is adjusted to a dark state, the light leakage can be further absorbed, eliminating light leakage, thus further protecting privacy. An anti-reflective coating is applied to the outside of the second ¼λ wave plate, which can effectively reduce stray light caused by interface reflection and improve the display quality.

| List of reference signs: | |
|---|---|
| 10: | Image projection device; |
| 20: | optical lens; |
| 30: | beam splitter; |
| 40: | first 1/4λ wave plate; |
| 50: | curved half-mirror; |
| 60: | curved lens; |
| 100: | liquid crystal dimming film; |
| 101: | anti-reflective coating; |
| 102: | second 1/4λ wave plate; |
| 103: | first polarizer; |
| 104: | first conductive layer; |
| 105: | first alignment layer; |
| 106: | liquid crystal layer; |
| 107: | second alignment layer |
| 108: | second conductive layer |
| 109: | second polarizer |
| 801: | OLED screen |
| 802: | first reflective layer |
| 803: | waveguide plate |
| 804: | second reflective layer |
| 805: | outer lens. |

DETAILED DESCRIPTION

Hereinafter, with reference to the drawings in the embodiments of the present disclosure, a clear and complete description of the schemes in the embodiments of the present disclosure will be provided. It should be apparent that the described embodiments are only a portion of the embodiments of the present disclosure, not all of them. Based on the embodiments of the present disclosure, all other embodiments that those skilled in the art obtain without making inventive contributions fall within the scope of protection of the present disclosure.

Embodiment 1

Figure 1:
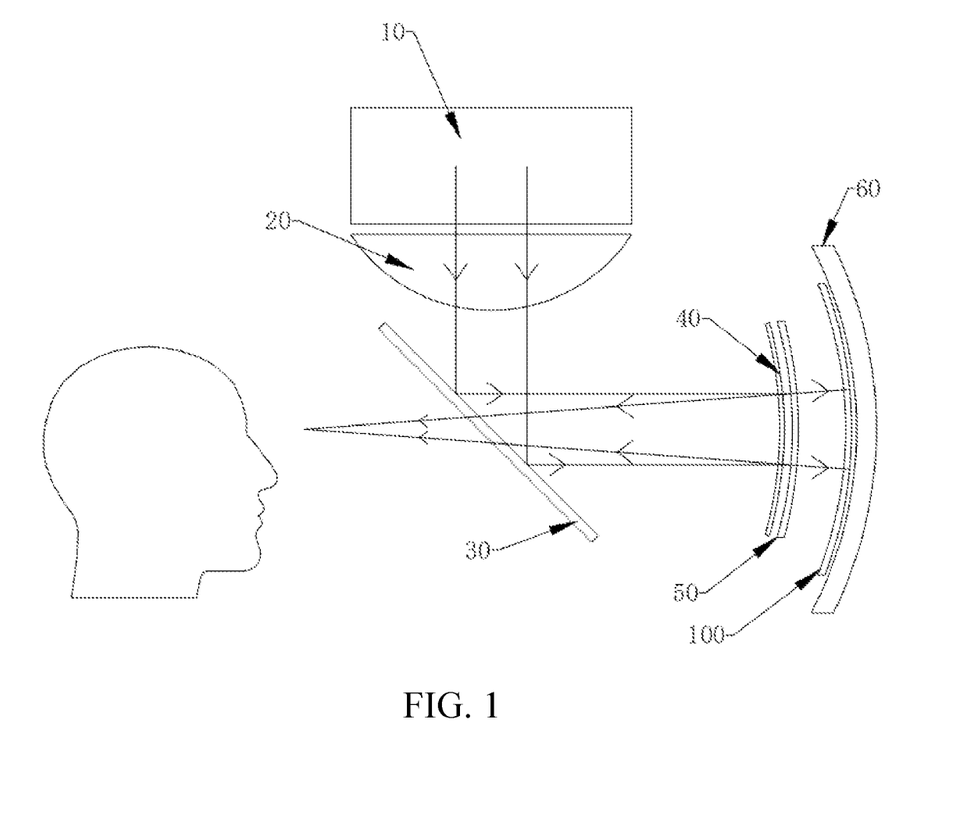
FIG. 1 is a schematic structural diagram of AR glasses according to Embodiments 1-4 of the present disclosure.

As shown in FIG. 1, an embodiment of the present disclosure provides a kind of AR glasses, including an image projection device 10, an optical lens 20, a beam splitter 30, a first ¼λ wave plate 40, a curved half-mirror 50, a liquid crystal dimming film 100 and a curved lens 60. After the light emitted by the image projection device 10 is amplified and focused by the optical lens 20, it passes through the beam splitter 30 arranged obliquely. The beam splitter 30 converts the light into a linearly polarized light in a horizontal direction. The linearly polarized light is reflected to the first ¼λ wave plate 40. The first ¼λ wave plate 40 changes the linearly polarized light into circularly polarized light. Part of the circularly polarized light is reflected by the curved half-mirror 50 to the observer's eyes to form a virtual image. Part of the circularly polarized light passes through the curved half-mirror 50 and is incident on the liquid crystal dimming film 100 and is absorbed by the liquid crystal dimming film 100.

Figure 2:
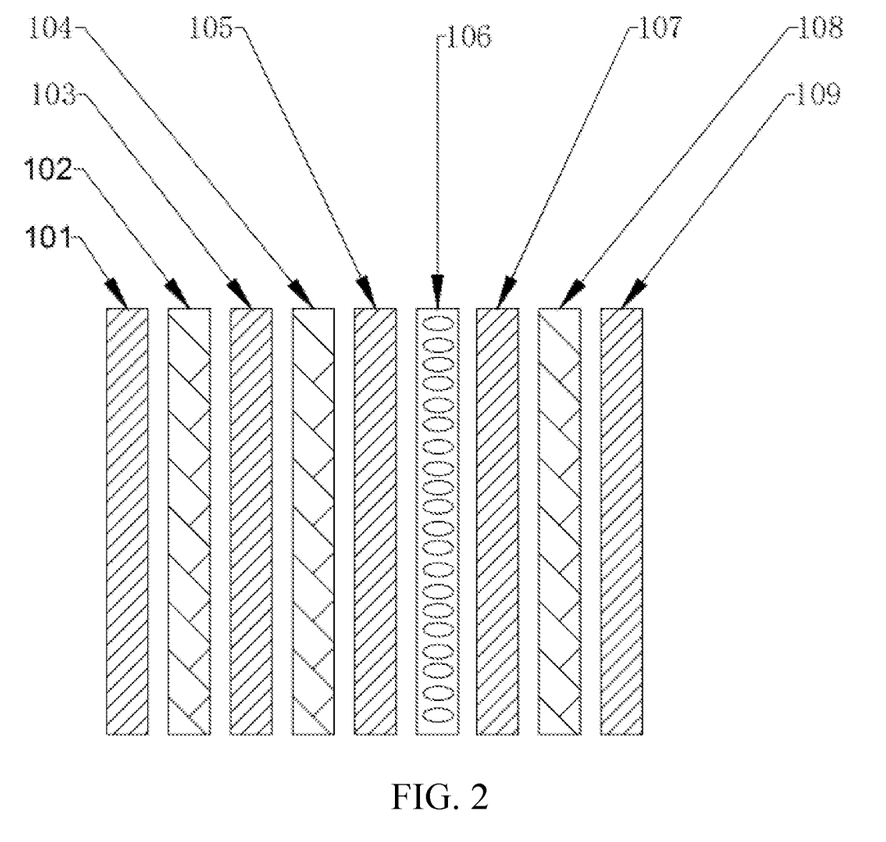
FIG. 2 is a schematic cross-sectional structural diagram of the liquid crystal dimming film according to Embodiment 1 of the present disclosure.

In this embodiment, as shown in FIG. 2, the liquid crystal dimming film 100 includes a second ¼λ wave plate 102, a first polarizer 103, a first conductive layer 104, a first alignment layer 105, a liquid crystal layer 106, a second alignment layer 107, a second conductive layer 108, and a second polarizer 109, which are stacked in sequence. The second ¼λ wave plate 102 converts the circularly polarized light that passes through the curved half-mirror 50 into linearly polarized light in a specific direction, which is then absorbed by the first polarizer 103.

In this embodiment, the mirror 50 is a curved half-mirror. The optical lens 20 is a free-form lens. The image projection device 10 is an organic light emitting diode (OLED) screen. The second ¼λ wave plate 102 is disposed on a side close to the curved half-mirror 50, and an anti-reflective coating 101 is applied to the outer surface of the second ¼λ wave plate 102. A layer of optically clear adhesive (OCA) is located between the second polarizer 109 and the curved lens 60, and the liquid crystal dimming film 100 is fixed to the curved lens 60 through OCA. The liquid crystal in the liquid crystal layer 106 is GH LC. The liquid crystal layer 106 includes but is not limited to one of TN, HTN, STN, VA, ECB, OCB, and GH LC. The optical axis of the second ¼λ wave plate 102 and the light absorption axis of the first polarizer 103 form an included angle of 45° or 135°, according to the actual use case.

In this embodiment, the optical path of the entire AR glasses is as follows: the OLED screen emits light, which is amplified and focused by the optical lens 20, and then passes through the beam splitter 30 arranged obliquely. A polarizing layer is provided on the surface of the beam splitter 30, which can convert the light into linearly polarized light in the horizontal direction. This light is then reflected onto the curved half-mirror 50. The first ¼λ wave plate 40 is set outside the curved half-mirror 50, which can convert linearly polarized light into circularly polarized light. The circularly polarized light is reflected by the curved half-mirror 50 into the eyes of the observer to form a virtual image. This path is virtual reality (VR).

Usually, the curved half-mirror 50 is set to have transmission and reflection functions at the same time. The reflection function is used for virtual reality (VR), and the transmission function is used for augmented reality (AR) to facilitate the observer to view the outside real scene. Due to the characteristics of the half-mirror 50, part of the light emitted by the OLED will pass through the curved half-mirror 50 and be seen by outside observers, leaking the privacy. At this time, the liquid crystal dimming film 100 is disposed on the curved lens 60. The structure of the liquid crystal dimming film 100 is sequentially arranged as shown in FIG. 2. At this time, the circularly polarized light that passes through the curved half-mirror 50 becomes linearly polarized light in a specific direction after passing through the second ¼λ wave plate 102 on the liquid crystal dimming film 100 and is then absorbed by the first polarizer layer 103, thereby eliminating light leakage and protecting privacy. This setting will not affect the external light entering the observer's eyes, allowing the observer to watch the virtual image and the external real picture at the same time to achieve the AR effect.

When the observer needs to activate the VR mode, the external light needs to be completely blocked to reduce light washout, improve the contrast and clarity of the virtual picture, and achieve an immersive viewing experience. At this time, an electric field of a certain intensity can be applied to the liquid crystal dimming film 100, so that the liquid crystal dimming film 100 is in a dark state and blocks external light.

In particular, an anti-reflective coating 101 is applied to the outer surface of the liquid crystal dimming film 100, that is, a layer of anti-reflective coating 101 is applied to the outer surface of the second ¼λ wave plate 102, which can effectively reduce stray light caused by surface reflection to improve image quality. The liquid crystal used by the liquid crystal dimming film 100 includes but is not limited to one of TN, HTN, STN, VA, ECB, OCB, and GH LC. In particular, the use of TN mode was found to achieve better results. In this embodiment, using the liquid crystal dimming film 100 as the dimming device has the following advantages compared to using EC dimming technology as the dimming device:

1. Good Reliability:

Using liquid crystal as the main material for dimming, the liquid crystal physically flips under the action of the electric field, which is a physical reaction. During the flipping process, the liquid crystal material does not suffer damage or attenuation, which is completely different from the electrochemical reaction of EC technology. Therefore, the liquid crystal material's lifespan is naturally higher than that of EC materials.

2. Quick Response:

Since the liquid crystal molecule flips under the applied electric field, the dimming response rate is much higher than the slow electrochemical reaction of EC. Generally, the response time of the liquid crystal dimming device is less than or equal to 100 milliseconds. In particular, it is even less than or equal to 10 milliseconds, while the response time of EC dimming devices is usually about 5 seconds. There is a big gap between the two. AR products require the fastest possible response rate.

3. Color Neutrality:

EC technology is classified into organic EC and inorganic EC. Inorganic EC, represented by tungsten trioxide, and organic EC, represented by viologen compounds, both appear blue after being powered on, and the dark state is blue, which seriously the optical quality.

The LCD dimming technology can easily adjust the color at dark state and set it to a neutral gray, which does not affect the color of the AR image and provides a better experience.

4. Uniform Color Change:

Liquid crystal dimming technology is based on physical reaction. The liquid crystal changes with the change of the direction of the electric field. The conductive layer can provide a uniform parallel electric field, so the liquid crystal can easily achieve uniform color change.

5. High Contrast:

Adopting one of the liquid crystal display modes of TN, HTN, STN, VA, ECB, OCB, and GHLC, in particular, using a TN-type liquid crystal dimming device and setting high-polarization polarizers on both sides of the liquid crystal layer 106 can achieve a dimming range between less than or equal to 2% and greater than or equal to 20%. In particular, it can achieve an ultra-high contrast dimming range between less than or equal to 0.5% and greater than or equal to 30%. The contrast ratio is greater than or equal to 60, which can effectively absorb the light leakage of the screen and greatly reduce the external light's washout of the virtual image.

EC technology, on the other hand, is limited by material characteristics and response rate, and cannot obtain a high-contrast dimming range. The typical dimming range of EC technology used for AR products is 10% to 60%, and the contrast ratio is about 6:1. The dark state is not dark enough to effectively absorb light leakage from the screen, and it cannot effectively block external light from washing the virtual screen.

6. Excellent Light Leakage Elimination Ability:

Ultra-high contrast and sufficiently dark dark-state can effectively eliminate light leakage on the screen;

Furthermore, by using one of PDLC or PNLC, the leaked light can be effectively scattered in the haze state to achieve haze-shielding and effectively protect privacy. In particular, PDLC or PNLC can be a dimming film based on dye-doped liquid crystals.

7. Full Spherical Lamination can be Achieved:

The flat liquid crystal dimming film 100 is made of flexible substrates, including but not limited to PC, TAC, PI, PMMA, PET, etc. The flat liquid crystal dimming film 100 is pre-bent through a novel process to a shape corresponding to the outer spherical lens curvature. It is then attached to the spherical lens through a vacuum lamination process to achieve full spherical fit, which can effectively improve the optical distortion problem.

Embodiment 2

Figure 3:
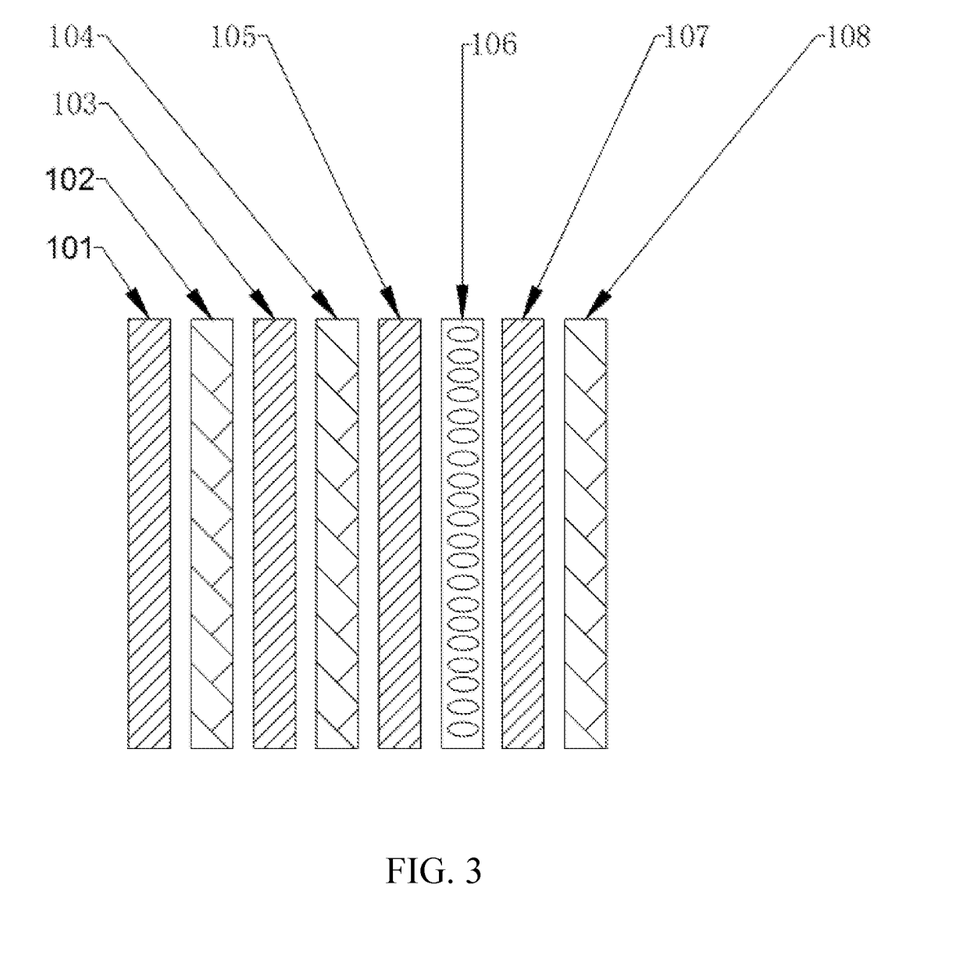
FIG. 3 is a schematic cross-sectional structural diagram of the liquid crystal dimming film according to Embodiment 2 of the present disclosure.

Refer to FIG. 3. The liquid crystal dimming film 100 of Embodiment 2 does not have a second polarizer compared to the liquid crystal dimming film 100 of Embodiment 1. The structure of the liquid crystal dimming film 100 in Embodiment 2 is sequentially the second ¼λ wave plate 102, the first polarizer 103, the first conductive layer 104, the first alignment layer 105, the liquid crystal layer 106, the second alignment layer 107, and the second conductive layer 108. An anti-reflective coating 101 is applied to the outer surfaces of the second ¼λ wave plate 102. In this embodiment, dye-doped guest-host liquid crystal (GHLC) is used as the liquid crystal layer 106.

In an embodiment, the light absorption axis of the first polarizer 103 and the long axis direction of the dye-doped liquid crystal are perpendicular to each other. Taking normally white GHLC as an example, when the liquid crystal layer 106 is not powered, the dimming film is in a transparent state, allowing external light to enter the observer's eyes. When power is on, the liquid crystal dimming film 100 is in a dark state, blocking external light. The electric field intensity can be adjusted according to actual needs to achieve the best viewing effect. Normally black GHLC is on the contrary, it is in a dark state when no electricity is supplied, and it is in a transparent state when electricity is supplied.

In this embodiment, no chiral agent is added to the GHLC, the GHLC is arranged in parallel in the same direction, and the long axis of the GHLC intersects perpendicularly with the front polarizer.

In particular, chiral agents can be added to GHLC. The addition of chiral agents can make GHLC appear in a spirally twisted state, which is beneficial to absorbing light from all directions and obtaining a darker dark state. The addition of chiral agent can be from 0.01 wt % to 50 wt %.

Embodiment 3

Figure 4:
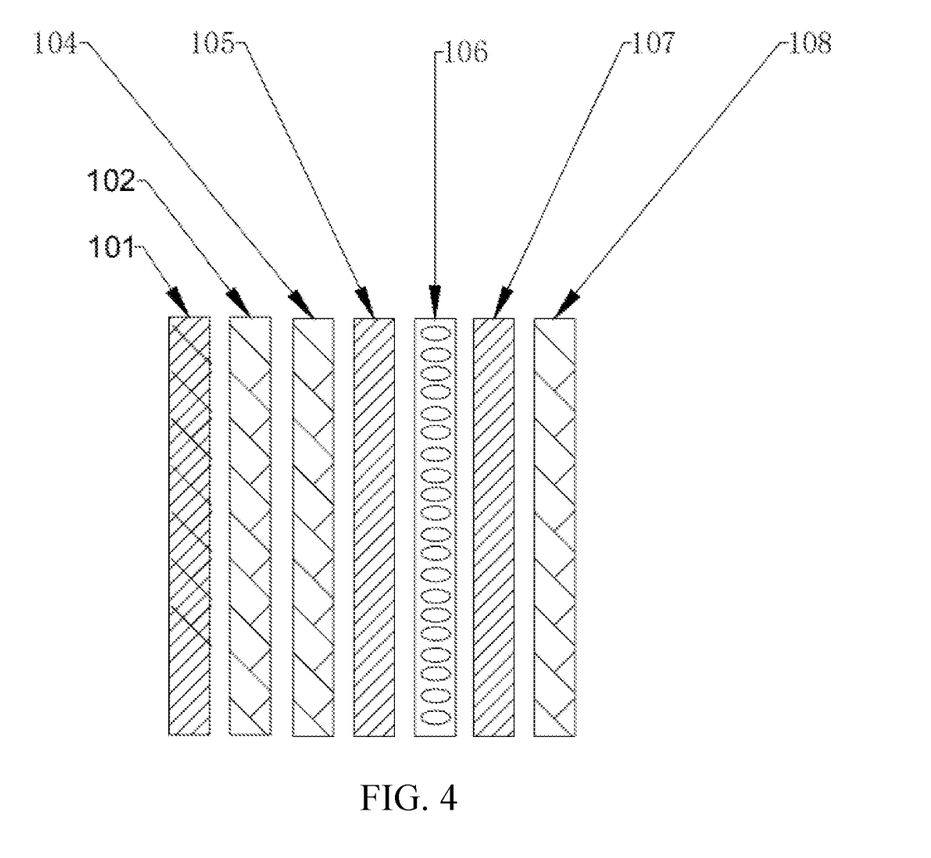
FIG. 4 is a schematic cross-sectional structural diagram of the liquid crystal dimming film according to Embodiment 3 of the present disclosure.

Refer to FIG. 4. The liquid crystal dimming film 100 of Embodiment 3 does not have a first polarizer 103 compared to the liquid crystal dimming film 100 of Embodiment 2. The structure of the liquid crystal dimming film 100 in Example 3 is sequentially the second ¼λ wave plate 102, the first conductive layer 104, the first alignment layer 105, the liquid crystal layer 106, the second alignment layer 107, and the second conductive layer 108. An anti-reflective coating 101 is applied to the outer surface of the second ¼λ wave plate 102. In particular, the liquid crystal layer 106 uses dye-doped guest-host liquid crystal (GHLC).

In particular, no chiral agent is added to GHLC, the GHLC is arranged in parallel in the same direction, and the long axis of the GHLC intersects the optical axis of the first ¼λ layer at 45° or 135° in the power-on or power-off state.

The circularly polarized light leakage passing through the curved half-mirror 50 passes through the second ¼λ wave plate 102 and is converted into linearly polarized light in a specific direction and is then absorbed by the dye-doped liquid crystal, thereby eliminating the light leakage.

In particular, chiral agents can be added to GHLC. The addition of chiral agents can make GHLC appear in a spirally twisted state, which is beneficial to absorbing light from all directions and obtaining a darker dark state. The addition of chiral agent can be from 0.01 wt % to 50 wt %.

Embodiment 4

Figure 5:
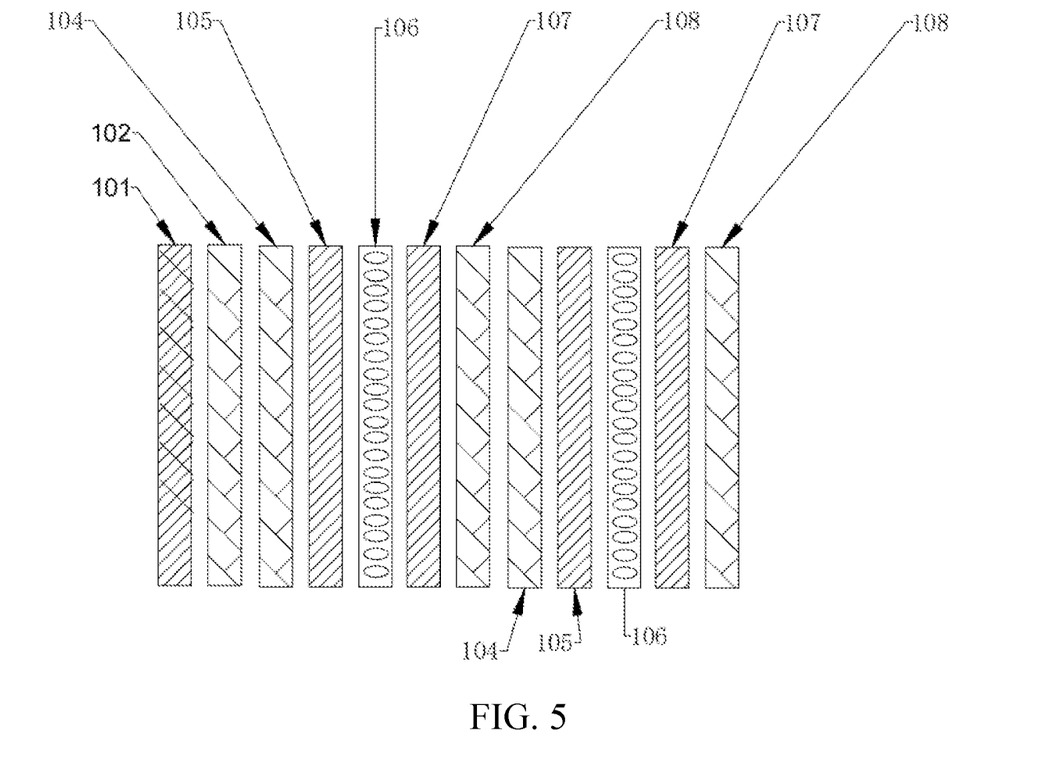
FIG. 5 is a schematic cross-sectional structural diagram of the liquid crystal dimming film according to Embodiment 4 of the present disclosure.

Refer to FIG. 5. Embodiment 4 adds a layer of liquid crystal layer 106 to Embodiment 3. That is, the liquid crystal layer 106 in Embodiment 4 is a double-layer liquid crystal layer 106, and both layers use GHLC. The arrangement directions of the GHLC in the two layers are vertically crossed, allowing for a wider transmittance range adjustment.

Embodiment 5

Figure 6:
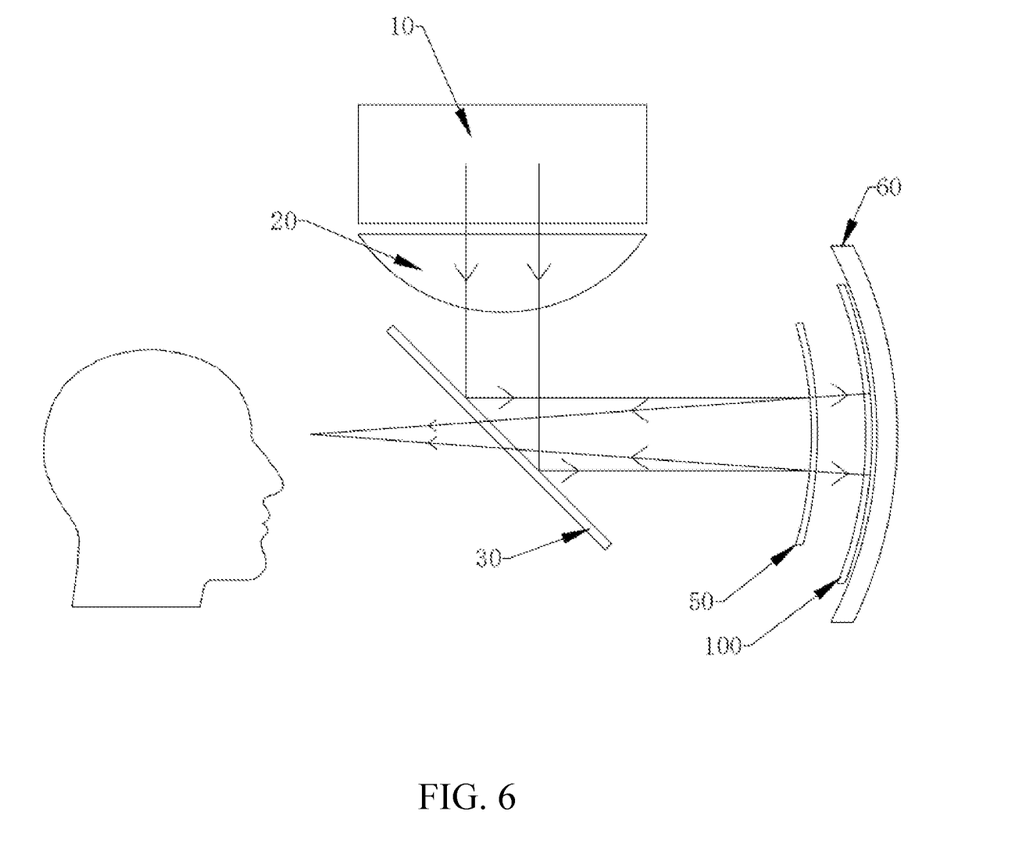
FIG. 6 is a schematic structural diagram of AR glasses according to Embodiments 5-7 of the present disclosure.

Please refer to FIG. 6. This embodiment proposes AR glasses, including an image projection device 10, an optical lens 20, a beam splitter 30, a curved half-mirror 50, a liquid crystal dimming film 100, and a curved lens 60;

After the light emitted by the image projection device 10 is amplified and focused by the optical lens 20, it passes through the obliquely arranged beam splitter 30. The beam splitter 30 converts the light into horizontal linearly polarized light and reflects it to the curved half-mirror 50. When reaching the curved half-mirror 50, part of the linearly polarized light is reflected to the observer's eyes through the curved half-mirror 50 to form a virtual image, and part of the linearly polarized light passes through the curved half-mirror 50 onto the liquid crystal dimming film 100 and is then absorbed by the liquid crystal dimming film 100.

Figure 7:
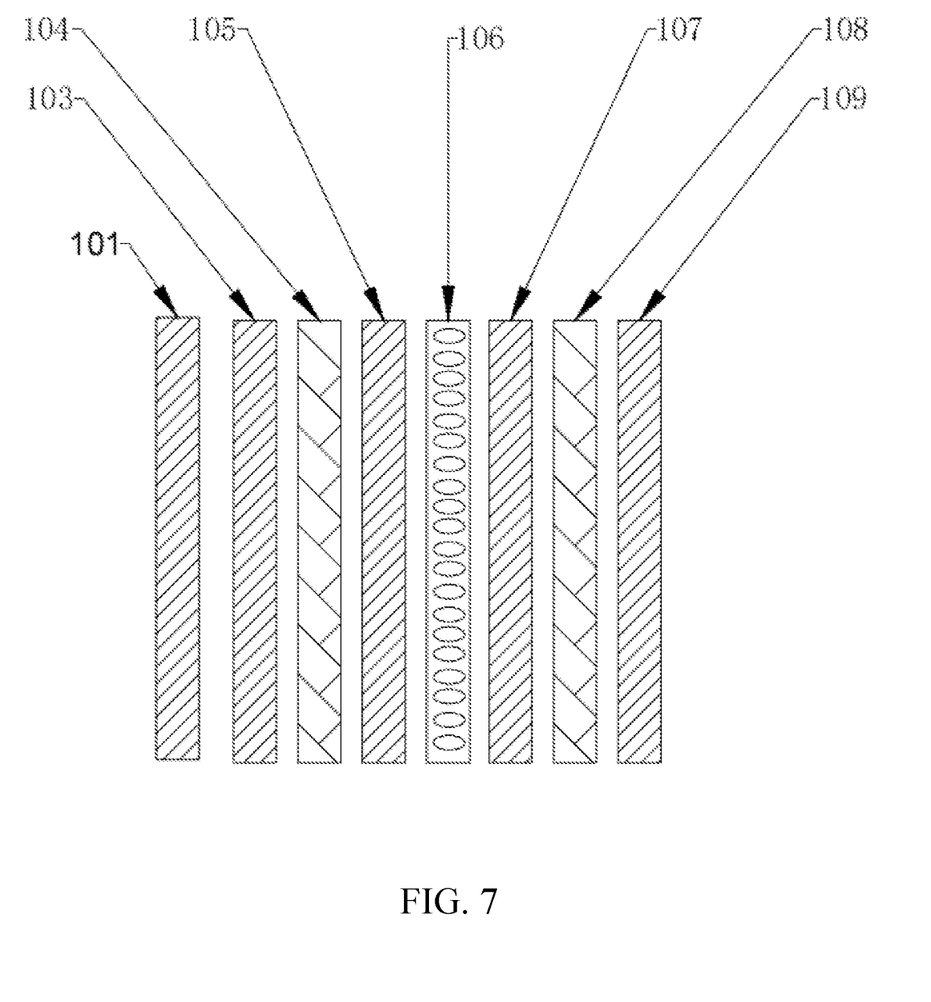
FIG. 7 is a schematic cross-sectional structural diagram of the liquid crystal dimming film according to Embodiment 5 of the present disclosure.

Further, referring to FIG. 7, the liquid crystal dimming film 100 includes a first polarizer 103, a first conductive layer 104, a first alignment layer 105, a liquid crystal layer 106, a second alignment layer 107, a second conductive layer 108, and a second polarizer 109, laminated in sequence. The first polarizer 103 absorbs the linearly polarized light that passes through the curved half-mirror 50. The transmission axis of the first polarizer 103 is perpendicular to the polarization direction of the linearly polarized light reflected by the beam splitter 30.

Embodiment 5 is based on Embodiment 1 and removes the first ¼λ wave plate 40 and the second ¼λ wave plate 102.

Embodiment 6

Figure 8:
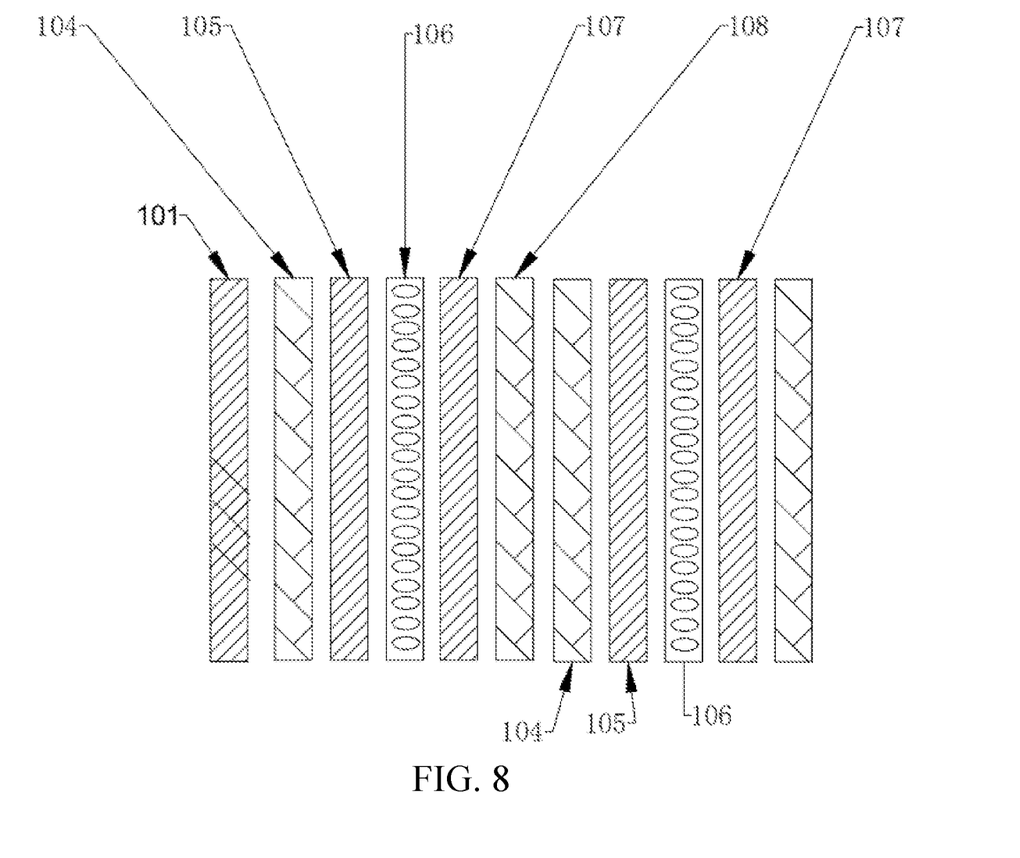
FIG. 8 is a schematic cross-sectional structural diagram of the liquid crystal dimming film according to Embodiment 6 of the present disclosure.

Refer to FIG. 8. Embodiment 6 is based on Embodiment 4 and removes the first ¼λ wave plate 40 and the second ¼λ wave plate 102. The liquid crystal layer 106 is a double-layer liquid crystal layer 106, and the two layers of liquid crystal layer 106 use GHLC. In particular, the long axis arrangement direction of the dye-doped liquid crystal in the GHLC layer can be arbitrarily superposed with the polarization direction of the linearly polarized light reflected by the beam splitter, and both can absorb the leaked light. In an embodiment, when the alignment direction of the long axis of the dye molecule in the first GHLC layer (from left) is parallel to the polarization direction of the linearly polarized light reflected by the beam splitter, the leaked linearly polarized light passing through the curved half-mirror 50 can be better absorbed. This embodiment is less expensive than Embodiment 4.

Embodiment 7

Figure 9:
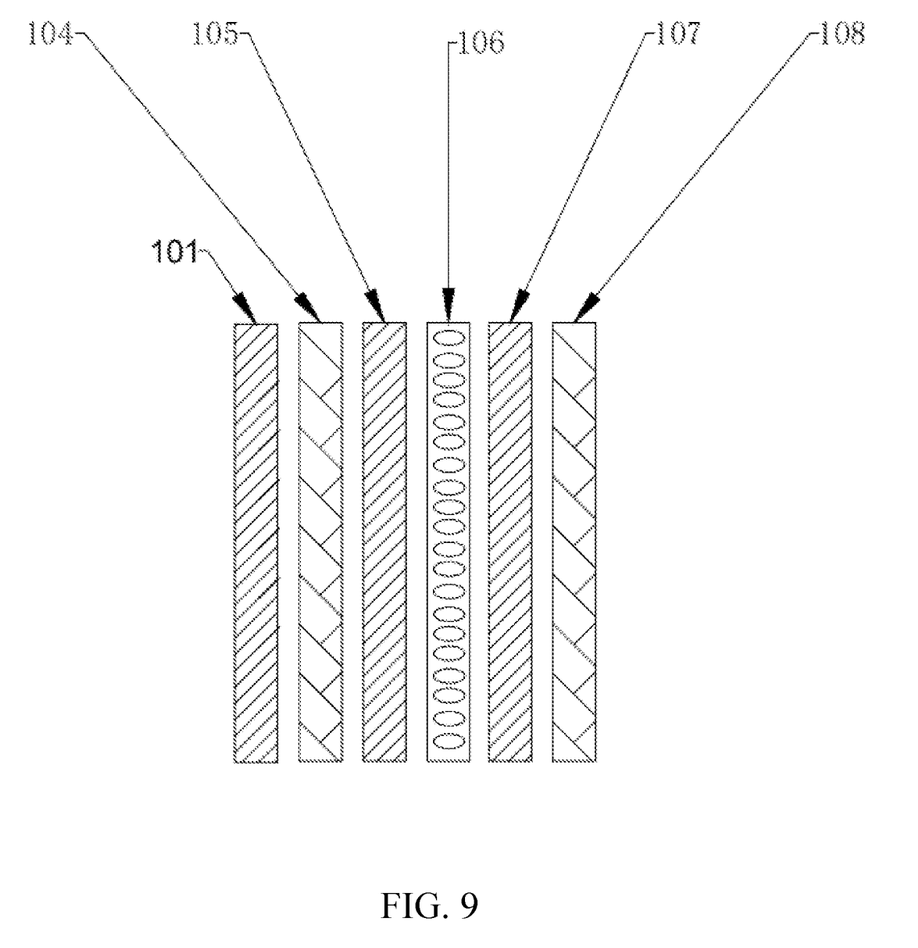
FIG. 9 is a schematic cross-sectional structural diagram of the liquid crystal dimming film according to Embodiment 7 of the present disclosure.

Refer to FIG. 9. Embodiment 7 is based on Embodiment 3 and removes the first ¼λ wave plate 40 and the second ¼λ wave plate 102. In particular, the liquid crystal layer 106 uses GHLC. When a certain proportion of chiral agents are added to the GHLC layer, the long axis arrangement direction of the dye liquid crystal of GHLC and the polarization direction of the linearly polarized light reflected by the beam splitter can be arbitrarily superimposed, and both can absorb the linearly polarized light leaking through the curved half-mirror 50.

In particular, the liquid crystal layer 106 uses GHLC. When no chiral agent is added to the GHLC layer, and the long axis arrangement direction of the dye-doped liquid crystal of GHLC is parallel to the polarization direction of the linearly polarized light reflected by the beam splitter, it can better absorb the linearly polarized light leaking through the curved half-mirror 50.

In particular, the liquid crystal layer 106 uses PNLC (Polymer Network Liquid Crystal). PNLC is made by adding liquid crystal polymer (RM) in a certain proportion to the nematic liquid crystal. The initial alignment direction of the nematic liquid crystal molecules is determined by the PI alignment layer. After RM and nematic liquid crystal are mixed and encapsulated, the mixture is cured by heat or ultraviolet, and the RM molecules gradually form long chain-like alignment along the alignment direction of the liquid crystal.

When the user needs to activate the AR function, no power is supplied. At this time, the long axis direction of the liquid crystal molecules is the same as the RM long chain direction, and the refractive index is the same, so it is in a transparent state with high transmittance, and the transmittance can be greater than or equal to 50%, in particular, can be greater than or equal to 80%. The light from the external scene can well enter the eyes of the user, presenting a better AR effect.

When the main observer needs to activate the VR function, an electric field of a certain intensity is applied to the liquid crystal layer 106, and the long axis of the liquid crystal molecules is deflected to form a certain angle with the RM long chain direction. In particular, when the angle becomes 90 degrees, the entire liquid crystal is dimmed. The layer exhibits a high-haze state, which can scatter the linearly polarized light leakage through the curved half-mirror 50, and has a high shielding effect, making it impossible for outside observers to see the projected picture clearly, enhancing privacy.

In particular, the alignment layers on both sides of the liquid crystal layer 106 in Embodiment 7 are removed, and the liquid crystal layer 106 is made of PDLC (Polymer Dispersed Liquid Crystal). PDLC is a nematic liquid crystal in which a certain proportion of polymer is added. Ultraviolet or heat curing leads to the phase separation of the polymer and the liquid crystal. And the polymer polymerizes to form a capsule that encapsulates the liquid crystal.

When the user needs to activate the VR function, without powering on, the liquid crystal molecules are arranged in a chaotic manner, and the incident light is repeatedly refracted and scattered between the liquid crystal molecules and the polymer, forming a high-haze state, which can scatter the leaked linearly polarized passing the half-mirror 50. This has a high shielding effect, making it impossible for outside observers to see the projected image clearly, thus enhancing privacy.

When the user needs to activate the AR function, an electric field of a certain intensity is applied to the liquid crystal layer 106, and the long axis of the liquid crystal molecules are deflected and uniformly aligned along the direction of the electric field. At this time, the refractive index of the long axis of the liquid crystal molecules is the same as or similar to the refractive index of the polymer. Thus, it is in a transparent state with high transmittance. The transmittance can be greater than or equal to 50%, especially, it can be greater than or equal to 80%. The light from the external scene can well enter the eyes of the user, presenting a better AR effect.

Embodiment 8

Figure 10:
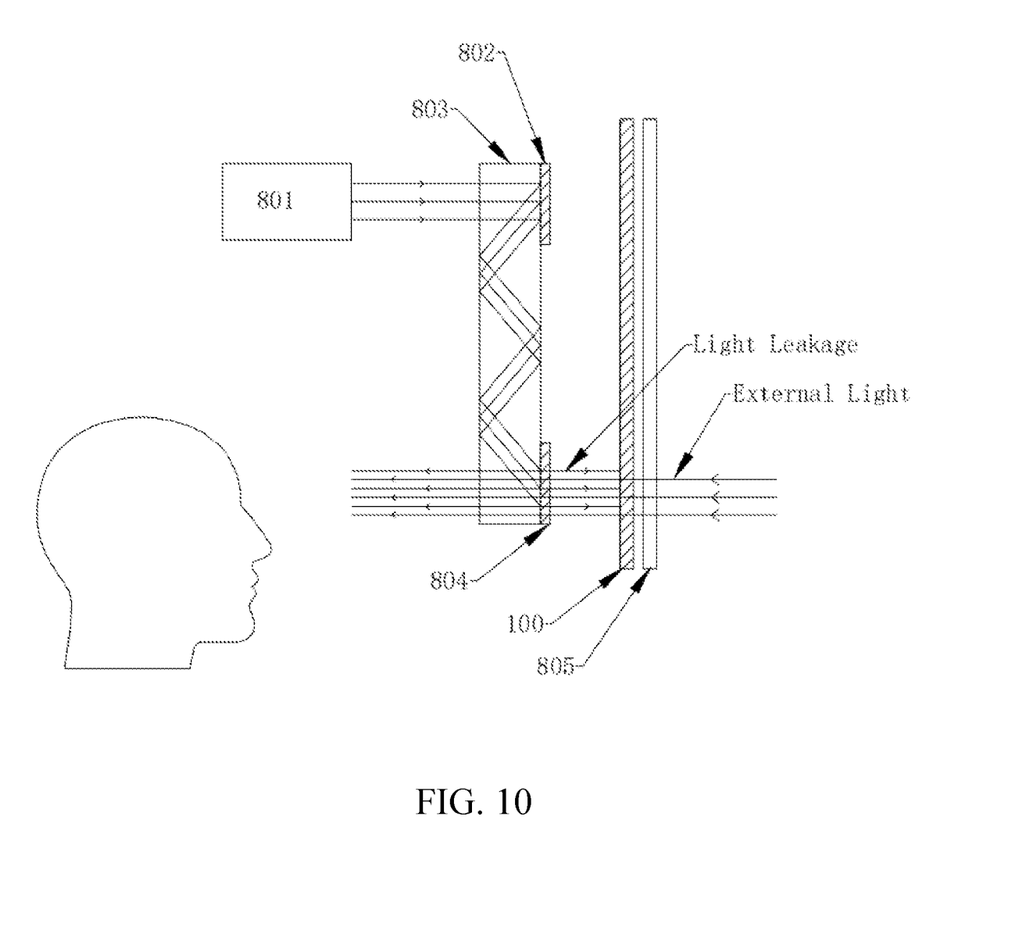
FIG. 10 is a schematic structural diagram of AR glasses according to Embodiment 8 of the present disclosure.

Refer to FIG. 10, which demonstrates another optical solution for an AR device. This solution is an optical waveguide. Compared with the BB solution, the optical waveguide solution has a higher external light transmittance, and the AR effect is more pronounced. The disadvantage is that it is more complex and more expensive.

The optical waveguide solution also has the issue of light leakage in the same direction as the BB when the AR function is activated. When the VR function is activated, the virtual image is severely washed out due to the high external light transmittance, resulting in a decrease in contrast.

The present disclosure proposes that the liquid crystal dimming films in the above-mentioned various embodiments can be applied to the optical solution of the AR device proposed in this embodiment, which can effectively solve the two problems of the optical waveguide solution.

The light path of the optical waveguide solution is as follows: the OLED screen 801 emits light, and after passing through the first reflective layer 802, the reflection angle of the incident light shifts. The reflected light enters the waveguide sheet 803 and is reflected multiple times on the inner surface of the waveguide sheet 803. And the angle of each reflection is close to or equal to a specific angle. In particular, when the reflection angle is equal to Brewster's angle, the reflectivity is maximum, and the light attenuation is minimum. When the reflected light reaches the second reflective layer 804, the reflection angle is corrected to be perpendicular to the viewing direction and enters the observer's eyes.

Under the AR mode, when the light passes through the second reflective layer 804, most of it will be reflected into the observer's eyes, but a part of the light will still pass through the reflective layer and be seen by outside observers, leaking privacy.

Under the VR mode, due to the high transmittance of the optical waveguide, more external light enters the observer's eyes, and the virtual image is severely washed out.

The above problems can be solved through the above embodiments by disposing the liquid crystal dimming film 100 on the outer lens 805 and changing the transmittance of the liquid crystal dimming film by applying or not applying an electric field to the liquid crystal layer.

It should be noted that the technical solutions in the various embodiments of the present disclosure can be combined with each other, but it must be based on the realization by those of ordinary skill in the art. When the combination of technical solutions is contradictory or cannot be realized, it should be considered that such a combination of technical solutions does not exist and is not within the scope of protection claimed by the present disclosure.

What is described above is only part or preferred embodiments of the present disclosure. Neither the text nor the drawings can therefore limit the scope of protection of the present disclosure. All contents of the description and drawings of the present disclosure are used under the overall concept of the present disclosure. Equivalent structural transformations, or direct/indirect application in other related technical fields are included in the scope of protection of the present disclosure.

What is claimed is:

1. AR glasses, comprising an image projection device, an optical lens, a beam splitter, a first ¼λ wave plate, a curved half-mirror, and a liquid crystal dimming film, wherein the liquid crystal dimming film comprises a polarizer and a dye-doped liquid crystal layer, light transmittance of the dye-doped liquid crystal layer is adjusted by adjusting a voltage applied to the dye-doped liquid crystal layer, and when the dye-doped liquid crystal layer absorbs light, it blocks external stray light and prevent the display screen from being viewed from an outside world to achieve privacy protection; and wherein after light emitted by the image projection device passes through the optical lens, it passes through the beam splitter obliquely arranged, the beam splitter converts the light into horizontal linearly polarized light and reflects it to the first ¼λ wave plate, the first ¼λ wave plate converts the linearly polarized light into circularly polarized light, part of the circularly polarized light is reflected to observer's eyes through the curved half-mirror, and part of the circularly polarized light is transmitted through the half-mirror and hits the liquid crystal dimming film and is absorbed by the liquid crystal dimming film.

2. The AR glasses of claim 1, wherein the polarizer comprises a first polarizer and a second polarizer, and the liquid crystal dimming film comprises a second ¼λ wave plate, the first polarizer, a first conductive layer, a first alignment layer, the liquid crystal layer, a second alignment layer, a second conductive layer, and the second polarizer, stacked in sequence, the second ¼λ wave plate changes the circularly polarized light that passes through the curved half-mirror into linearly polarized light in a specific direction, and then the linearly polarized light is absorbed by the first polarizer.

3. The AR glasses of claim 2, wherein the AR glasses further comprise curved lenses, and the liquid crystal dimming film is disposed inside the curved lenses.

4. The AR glasses of claim 1, wherein the optical lens is a free-form lens.

5. The AR glasses of claim 1, wherein the image projection device is one of an organic light emitting diode (OLED), a liquid crystal display (LCD), a liquid crystal on silicon (LCOS), a micro electro mechanical system (MEMS), and a digital micromirror device (DMD).

6. The AR glasses of claim 2, wherein the second ¼λ wave plate is disposed on a side of the first polarizer close to the curved half-mirror, an anti-reflective coating is applied onto a surface of the second ¼λ wave plate close to the curved half-mirror.

7. The AR glasses of claim 3, wherein a layer of optically clear adhesive is located between the second polarizer and the curved lens, and the liquid crystal dimming film is fixed to the curved lens through the layer of optically clear adhesive.

8. The AR glasses of claim 2, wherein liquid crystal in the liquid crystal layer is one of TN, HTN, STN, VA, ECB, OCB, and GH LC.

9. The AR glasses of claim 2, wherein an optical axis of the second ¼λ wave plate and a light absorption axis of the first polarizer form an included angle of 45° or 135°.

10. AR glasses, comprising an image projection device, an optical lens, a beam splitter, a curved half-mirror, a liquid crystal dimming film, and a curved lens; transmittance of the liquid crystal dimming film is adjusted by adjusting a voltage applied to the liquid crystal dimming film, and when the liquid crystal dimming film absorbs light, it blocks external stray light and prevent the display screen from being viewed from an outside world to achieve privacy protection; and wherein after the light emitted by the image projection device is amplified and focused by the optical lens, it passes through the beam splitter arranged obliquely, the beam splitter converts the light into horizontal linearly polarized light and reflects it to the curved half-mirror, part of the linearly polarized light is reflected to observer's eyes through the curved half-mirror to form a virtual picture, and part of the linearly polarized light is transmitted through the curved half-mirror to the liquid crystal dimming film and is absorbed by the liquid crystal dimming film.

11. The AR glasses of claim 10, wherein the liquid crystal dimming film comprises a first polarizer, a first conductive layer, a first alignment layer, a liquid crystal layer, a second alignment layer, a second conductive layer, and a second polarizer, stacked in sequence, the first polarizer absorbs the linearly polarized light that passes through the curved half-mirror, and a light transmission axis of the first polarizer is perpendicular to a polarization direction of the linearly polarized light reflected by the beam splitter.

12. The AR glasses of claim 11, wherein the liquid crystal layer comprises a single liquid crystal layer or double liquid crystal layers.

* * * * *